H. DICKE & E. KLINKMANN.
APPARATUS FOR WELDING TUBES.
APPLICATION FILED JAN. 2, 1908.

939,591. Patented Nov. 9, 1909.

Witnesses:

Inventors:
Hugo Dicke,
Emil Klinkmann,

UNITED STATES PATENT OFFICE.

HUGO DICKE, OF FRANKFORT-ON-THE-MAIN, AND EMIL KLINKMANN, OF ZAWODZIE, NEAR KATTOWITZ, GERMANY, ASSIGNORS TO THE CORPORATION OF DELLWIK-FLEISCHER, WASSERGAS GESELLSCHAFT M. B. H., OF FRANKFORT-ON-THE-MAIN, GERMANY.

APPARATUS FOR WELDING TUBES.

939,591.   Specification of Letters Patent.   Patented Nov. 9, 1909.

Application filed January 2, 1908. Serial No. 409,028.

*To all whom it may concern:*

Be it known that we, HUGO DICKE, (director,) and EMIL KLINKMANN, (engineer,) both subjects of the German Emperor, HUGO DICKE being resident of Frankfort-on-the-Main, Germany, Marienstrasse No. 5, and EMIL KLINKMANN, being resident of Zawodzie, near Kattowitz, Silesia, Germany, Barbarastrasse, have invented a new and useful Improvement in Apparatus for Welding Tubes, of which the following is a specification.

The object of the invention is to provide a compact and efficient form of apparatus involving a carriage for supporting a length of tube to be welded along a longitudinal seam, two coöperating burners adjustably mounted on said carriage and adapted to heat the tube along the seam, both interiorly and exteriorly, to bring the edges to welding temperature, said burners being adjustable on the carriage so as to be used in connection with tubes of different diameters, and also relatively adjustable with respect to each other, so that they may be brought in relatively close engagement with the portions of the tube to be heated. Associated with the carriage in the welding operation are a pair of welding rolls between which is located a mandrel provided with peripherally spaced rollers adapted to engage the interior of the tube and assist in the feeding operation of the tube through the rolls and also to cause one of its peripheral rollers to engage the under surface of the heated edges of the tube and by means of the coöperation of the adjacent roll to effectively weld said heated edges into a homogeneous joint. The mandrel with its peripherally spaced rollers permits the tube, in the process of welding the seam, to be passed through the rolls without danger of being jammed therein and without liability of bursting the tube at the welding points.

Figure 1:
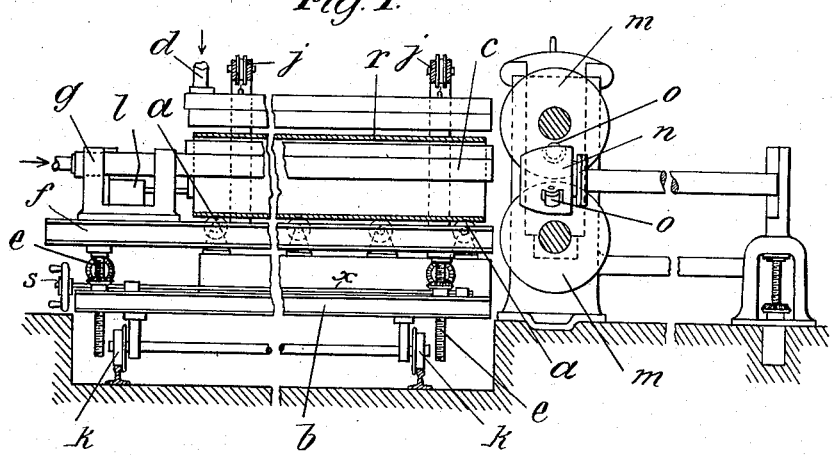
Figure 2:
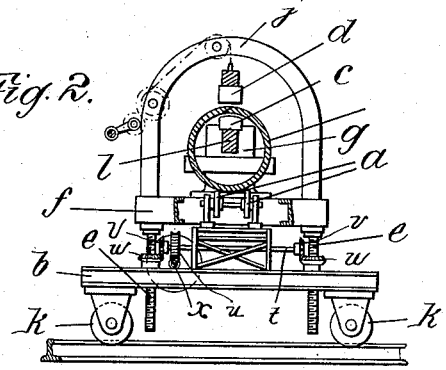
Figure 3:
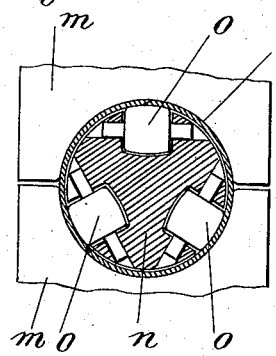
Figure 4:
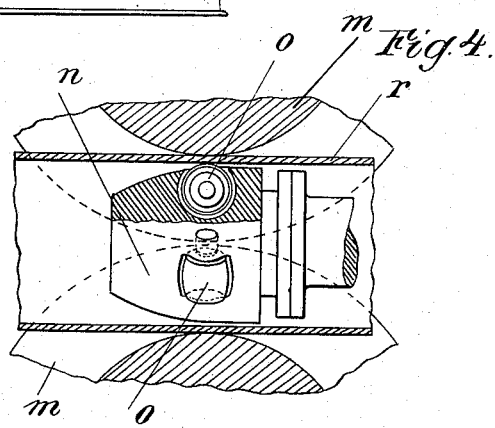

In the accompanying drawings, Figure 1 is a side elevation, partly in section, of the welding apparatus constructed in accordance with the invention. Fig. 2 is a vertical cross section through the tube supporting carriage and heating apparatus. Figs. 3 and 4 are enlarged cross sectional and longitudinal sectional views of the mandrel and coöperating rolls.

Referring to the drawings, $b$ indicates the platform of a carriage, mounted upon suitable wheels $k$, which operate upon rails, which may be laid between the preliminary tube shaping machine, and the ultimate welding rolls. Mounted upon the platform $b$ are a series of transversely disposed rollers $a$ which serve to support the tube and permit the same to be moved transversely of the carriage, in position to be heated by the burners, and also from such heating position into engagement with the welding rolls and mandrel, to be hereinafter described.

Mounted for vertical adjustment on the platform $b$ is the burner carrying frame, consisting of a framework $f$, spaced laterally with respect to the tube supporting rolls $a$ so as to permit said frame $f$ to be adjusted in a vertical direction. Said frame $f$ is conveniently supported at four points by means of jack screws $e$ which are simultaneously operated to raise and lower the frame $f$ by means of gearing comprising a shaft $x$ operated by a hand wheel $s$, upon which shaft is mounted worms engaging worm gears $u$, upon two countershafts, each of which is provided with bevel gears $v$ on the respective ends, which drive bevel pinions $w$, which in turn constitute portions of rotatory nuts engaging the upper surface of the platform $b$ and operating with the threaded shanks of the jack screws $e$ to raise and lower the latter to any desired extent. By rotating the hand wheel $s$ in one direction or the other, it will be obvious that the several jack screws will be raised and lowered simultaneously, and consequently the frame $f$ will be correspondingly raised or lowered.

Mounted on the frame $f$ is a bracket or support $g$, in which is supported a lower burner $c$ which extends transversely of the platform $b$ and is adapted to heat the entire length of the tube $r$ at the edges thereof where the weld is to be effected. Carried by the frame $f$ are two yokes $j$, from which the upper burner $d$ is suspended by a suitable adjusting means, as ropes or cables to permit said upper burner to be moved toward and from the lower burner, and therefore to be brought in juxtaposition to the edges of the tube. Inasmuch as the position of the tube, on the platform $b$ of the carriage is determined by the rollers $a$, it will be apparent that the two burners $c$ and $d$ may be adjusted to accommodate any size tube. For instance, both burners may be simultaneously adjusted by means of the jack screws *e* until the lower burner *c* is in proper position, after which the upper burner *d* may be adjusted with respect to the lower burner and the tube.

The burners *c* and *d* may be of any convenient type, but are preferably gas burners connected by flexible conduits with gas and air reservoirs.

The tube is first given its initial form in any appropriate bending apparatus and is then slid into position on the carriage *b* and supported on the rollers *a* so that the lower burner *c* lies within the tube or adjacent the edges thereof to be welded, and the upper burner *d* is adjusted to overlie the outer edges of the seam, as indicated in Figs. 1 and 2. The heat of the burning gas then raises the temperature of the metal at the edges of the seam over the entire length of the latter, without, however, unduly heating the remaining portion of the tube, so that the heat is entirely localized along the line of the proposed weld and a material saving in the amount of heat required is effected. It is found desirable to impart a small reciprocatory movement to the tube during the heating operation to insure uniformity of the heating over the entire length of the edges to be welded. While the heating is being effected, the carriage is moved laterally from its position in front of the tube forming apparatus to a point in front of the welding mechanism. The latter consists of a mandrel *n* and two suitably shaped rolls *m, m* lying on each side of the mandrel, said mandrel, and the rolls being adapted to engage the tube and feed the same forward. The initial forward movement necessary to engage the tube with the rolls and the mandrel is effected by a hydraulic jack or other appropriate means *l* located on the frame *f*. After the forward edge of the tube has been engaged with the rolls *m, m* and the mandrel *n*, these elements will grip the tube and feed it forward.

In order to afford an even uniform movement of the tube through the rolls and over the mandrel, and at the same time produce a positive rolling action on the heated edges of the tube at the seam, the mandrel *n* is provided with peripheral rollers *o*, three such rollers being shown in the particular exemplification of the machine, which engage the inner surface of the tube. The upper roller *o* lies below the upper roll *m* and coöperates with the latter to force the heated edges of the pipe together and weld the same into a uniform, homogeneous joint.

After the welding has been completed, the tube is withdrawn from the rolls in any preferred manner and passed to a finishing apparatus.

The improved apparatus, as hereinbefore described, possesses many advantages over apparatus heretofore employed for similar purposes, inasmuch as the preliminarily formed tube is handled, during the heating operation entirely upon the carriage *b* so that there is no chance of injuring the metal of the tube and, moreover, the heating effect being entirely localized along the edges of the tube at the joint, the amount of gas required to effect the heating is reduced to a minimum, and the entire operation, including the heating and welding is effected in a most expeditious and efficient manner.

What we claim is:—

1. In a tube welding apparatus, the combination of a carriage, a tube support on said carriage, a burner support vertically adjustable on said carriage, and burners relatively adjustable toward and from each other on said burner support.

2. In a tube welding apparatus, the combination of a carriage, tube supporting rollers on said carriage, a burner support vertically adjustable on said carriage, and burners relatively adjustable toward and from each other on said support.

3. In a tube welding apparatus, the combination of a carriage, a tube support on said carriage, a burner support vertically adjustable on said carriage, burners relatively adjustable toward and from each other on said burner support, welding rolls, and a coöperating mandrel, adapted to receive the tube from the carriage and weld the heated edges thereof.

4. In a tube welding apparatus, the combination of a reciprocatory carriage, a tube support on said carriage, a burner support, including a vertically adjustable frame and supporting yokes on said carriage, a lower burner mounted on said frame, an upper burner adjustably mounted on said yokes, welding rolls and a coöperating mandrel adapted to receive the tube from the carriage.

In testimony, that we claim the foregoing as our invention, we have signed our names in presence of two witnesses, this nineteenth day of December 1907.

HUGO DICKE.
EMIL KLINKMANN.

Witnesses:
HENRY HASPER,
WOLDEMAR HAUPT.